United States Patent
Cumberland et al.

(10) Patent No.: US 9,760,924 B2
(45) Date of Patent: Sep. 12, 2017

(54) AUTOMATIC SEARCH OF LOCAL INVENTORY

(71) Applicant: Kibo Software, Inc., San Luis Obispo, CA (US)

(72) Inventors: David Jeffrey Cumberland, San Luis Obispo, CA (US); Natasha Festa, San Luis Obispo, CA (US); Nelson Miguel Flores, Templeton, CA (US); Edward Allen Stevens, Carpenteria, CA (US); Jera Vincelli, San Luis Obispo, CA (US)

(73) Assignee: KIBO Software, Inc., Dallas, TX (US)

( * ) Notice: Subject to any disclaimer, the term of this patent is extended or adjusted under 35 U.S.C. 154(b) by 0 days.

(21) Appl. No.: 14/920,738

(22) Filed: Oct. 22, 2015

(65) Prior Publication Data

US 2016/0225045 A1  Aug. 4, 2016

Related U.S. Application Data

(60) Provisional application No. 62/111,060, filed on Feb. 2, 2015.

(51) Int. Cl.
*G06Q 30/00* (2012.01)
*G06Q 30/06* (2012.01)
(Continued)

(52) U.S. Cl.
CPC ..... *G06Q 30/0605* (2013.01); *G06F 17/3087* (2013.01); *G06F 17/30554* (2013.01);
(Continued)

(58) Field of Classification Search
CPC ....... G06Q 30/0601–30/0608; G06Q 30/0623; G06Q 30/0625; G06Q 30/0605
(Continued)

(56) References Cited

U.S. PATENT DOCUMENTS 5,845,265 A  12/1998  Woolston
6,085,176 A   7/2000  Woolston
(Continued)

FOREIGN PATENT DOCUMENTS

WO   WO2014109938 A9   12/2014

OTHER PUBLICATIONS

Zhang, Haonan, Parallel processing techniques for electronic commerce systems, 2006, ProQuest Dissertations Publishing.*
(Continued)

*Primary Examiner* — Michael Misiaszek
*Assistant Examiner* — Brittney N Miller
(74) *Attorney, Agent, or Firm* — Knobbe, Martens, Olson & Bear, LLP

(57) ABSTRACT

Methods, systems, and apparatus, including computer programs encoded on computer storage media, for determining which of multiple vendors have a product in stock. One of the methods includes maintaining a central database that includes information about respective inventories of multiple vendors, receiving information from a first user device identifying a requested commerce object, and a geographical area, identifying a plurality of sources of available inventory data, searching the plurality of sources for available inventory of the requested commerce object, the searching comprising performing all three of the following processes substantially in parallel: performing real-time searching in the central database, performing sub-real-time searching in respective databases maintained by individual vendors, and initiating manual-assisted searching, asynchronously receiving and aggregating search results into groups, and serving, for each of the groups of search results, instructions for a presentation of the respective composite user interface to a second user device.

20 Claims, 6 Drawing Sheets

(51) Int. Cl.
*H04W 4/02* (2009.01)
*G06F 17/30* (2006.01)
*G06Q 10/08* (2012.01)

(52) U.S. Cl.
CPC ....... *G06Q 10/087* (2013.01); *G06Q 30/0625* (2013.01); *G06Q 30/0639* (2013.01); *G06Q 30/0641* (2013.01); *H04W 4/02* (2013.01)

(58) Field of Classification Search
USPC ................ 705/26.1–27.2, 26.61, 26.62, 26.2
See application file for complete search history.

(56) References Cited

U.S. PATENT DOCUMENTS

| | | | |
|---|---|---|---|
| 6,202,051 | B1 | 3/2001 | Woolston |
| 6,249,772 | B1 | 6/2001 | Walker et al. |
| 6,253,187 | B1 | 6/2001 | Fox |
| 6,260,024 | B1 | 7/2001 | Shkedy |
| 6,263,317 | B1 | 7/2001 | Sharp et al. |
| 6,453,352 | B1 | 9/2002 | Wagner et al. |
| 6,601,764 | B1 | 8/2003 | Goodwin |
| 6,754,636 | B1 | 6/2004 | Walker et al. |
| 6,954,735 | B1 | 10/2005 | Djupsjoebacka |
| 7,062,451 | B1 | 6/2006 | Dentel et al. |
| 8,396,756 | B1 | 3/2013 | Stevens |
| 8,635,238 | B2 | 1/2014 | Tisi |
| 8,688,524 | B1 | 4/2014 | Ramalingam et al. |
| 2002/0147651 | A1* | 10/2002 | Hoar ................ G06Q 20/203 705/22 |
| 2003/0023499 | A1 | 1/2003 | Das et al. |
| 2003/0200152 | A1 | 10/2003 | Divekar |
| 2006/0138219 | A1 | 6/2006 | Brzezniak |
| 2007/0118520 | A1 | 5/2007 | Bliss |
| 2008/0010170 | A1 | 1/2008 | Chan |
| 2008/0097829 | A1 | 4/2008 | Ritter |
| 2008/0275791 | A1 | 11/2008 | Youssef |
| 2009/0248548 | A1 | 10/2009 | Obermeyer |
| 2013/0013460 | A1* | 1/2013 | Seligman ........... G06Q 30/0256 705/27.1 |
| 2013/0151376 | A1 | 6/2013 | Stevens |
| 2013/0159145 | A1 | 6/2013 | Stevens |
| 2014/0249947 | A1 | 9/2014 | Hicks |
| 2015/0088689 | A1* | 3/2015 | de Castro Leao Monteiro ........... G06Q 30/0625 705/26.43 |
| 2015/0100433 | A1* | 4/2015 | Choy ................. G06Q 30/0635 705/14.69 |
| 2016/0055502 | A1* | 2/2016 | Pitz .................... G06Q 30/0205 705/7.34 |

OTHER PUBLICATIONS

"Inventory management software", Wikipedia, http://en.wikipedia.org/wiki/Inventory_management_software, downloaded from the Internet Jan. 30, 2015, 6 pages.

European Application No. 16153748.5, Extended European Search Report dated /17/2016, 8 pages.

Anonymous: "idealo.de—Deutschlands groBer Preisvergleich", Dec. 31, 2014, XP055255626, Retrieved from the Internet: URL:https://web.archive.org/web/20141231205533/http://www.idealo.de/ [retrieved on Mar. 7, 2016].

Anonymous: "Idealo—Wikipedia, the free encyclopedia", Jan. 15, 2015, XP055255628, Retrieved from the Internet: URL:https://en.wikipedia.org/w/index.php?title=ldealo&oldid=642659531 [retrieved on Mar. 7, 2016].

U.S. Appl. No. 15/042,464, dated Feb. 12, 2016, Cumberland et al.

* cited by examiner

AUTOMATIC SEARCH OF LOCAL INVENTORY

CROSS-REFERENCE TO RELATED APPLICATIONS

This application claims benefit under 35 U.S.C. §119(e)(1) of U.S. Provisional Application No. 62/111,060, filed on Feb. 2, 2015, which is incorporated by reference herein.

TECHNICAL FIELD

This specification relates to systems and techniques to determine a local inventory for a product at multiple vendor retail locations.

BACKGROUND

A consumer may view a product web page to order the product online, and have the product shipped to their home, or determine whether to visit a brick and mortar vendor retail location to purchase the product. For instance, the consumer may go to a retailer's physical location to try a product on or otherwise interact with the product, e.g., to view a television.

The consumer uses a computer, either wired or wireless, to view the product web page. The computer may request content for the web page from one or more servers. The servers may store content for the web page in respective databases. For example, a first server may store product information and a second server may store product images. Each of the servers and the computer may communication using a network, such as the Internet or another Wide Area Network.

When a vendor retail location receives a new product, both the first and the second server may be updated to include information about the new product. For instance, both servers may receive an identifier for the new product and the first server may receive text describing the specifications of the new product and the second server may receive one or more images for the new product.

In some examples, the computer may provide a universal resource identifier (URI) to a third server, and the third server uses the URI to determine a product identifier for a product. The third server may then query the first server and the second server, using the product identifier, for the product information and any corresponding images. The first and second servers may provide the product information and the corresponding images to the third server or to the computer.

The computer may be a desktop computer, a laptop, or a smart phone to name a few examples. A connection between the computer and the third server may be a direct connection, e.g., without any other computers sending or receiving data intended for one of the two devices, or an indirect connection, e.g., with one or more other computers receiving data from one of the two devices and forwarding the data to the other device.

The third server, or another device, may include an inventory database to track inventory levels of products, e.g., for the vendor retail location. The third server may use the inventory database to request a particular product from a warehouse when the inventory of the particular product is low.

SUMMARY

In general, one aspect of the subject matter described in this specification can be embodied in methods that include the actions of maintaining a central database that includes information about respective inventories of a plurality of different vendors, wherein the central database is kept up-to-date via automated data integration with inventory systems maintained by the plurality of vendors, receiving information from a first user device identifying (a) a requested commerce object for which available inventory is sought, and (b) a geographical area, identifying a plurality of sources of available inventory data for the vendors that are located within a specific distance of the geographical area, searching the plurality of sources for available inventory of the requested commerce object, the searching comprising performing all three of the following processes substantially in parallel: performing real-time searching for inventory data of the requested commerce object in the central database that has been maintained with up-to-date information about potential vendors' respective inventories via data integration, performing sub-real-time searching for inventory data of the requested commerce object in respective databases maintained by individual vendors, and initiating manual-assisted searching for the requested commerce objet by automated communication with one or more entities located at respective vendor locations, the automated communication prompting the one or more entities to respond with information about whether the associated vendor has available inventory of the requested commerce object, asynchronously receiving and aggregating search results into groups as the search results become available to form a respective composite user interface having inventory information from each of at least a portion of the searched plurality of sources, and serving, for each of the groups of search results, instructions for a presentation of the respective composite user interface to a second user device, different from the first user device, the composite user interface displaying the aggregated search results. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

In general, one aspect of the subject matter described in this specification can be embodied in methods that include the actions of maintaining a central database that includes information about respective inventories of a plurality of different vendors, wherein the central database is kept up-to-date via automated data integration with inventory systems maintained by the plurality of vendors, receiving information from a server identifying (a) a requested commerce object for which available inventory is sought, and (b) a geographical area, identifying a plurality of sources of available inventory data for the vendors that are located within a specific distance of the geographical area, searching the plurality of sources for available inventory of the requested commerce object, the searching comprising performing all three of the following processes substantially in parallel: performing real-time searching for inventory data of the requested commerce object in the central database that has been maintained with up-to-date information about potential vendors' respective inventories via data integration, performing sub-real-time searching for inventory data of the requested commerce object in respective databases maintained by individual vendors, and initiating manual-assisted searching for the requested commerce object by automated communication with one or more entities located at respective vendor locations, the automated communication prompting the one or more entities to respond with information about whether the respective vendor has available inventory of the requested commerce object, asynchronously receiving and aggregating search results into groups as the search results become available to form a respective composite user interface having inventory information from each of at least a portion of the searched plurality of sources, and serving, for each of the groups of search results, the group of search results to the server for presentation of the aggregated search results in the group of search results in a respective composite user interface on a user device. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. Asynchronously receiving and aggregating search results into groups as the search results become available to form a respective composite user interface may include asynchronously receiving and aggregating search results into groups as the search results become available to form a respective composite web page. Serving, for each of the groups of search results, instructions for the presentation of the respective composite user interface may include serving, for each of the groups of search results, instructions for the presentation of the respective composite web page.

In some implementations, the method may include maintaining a history of particular types of commerce objects that each of the plurality of vendors have historically stocked in their respective inventories. Identifying the plurality of the vendors may include determining that each of the plurality of vendors have historically stocked the requested commerce object. Receiving the information from the first user device may include receiving identification of the specific distance. The method may include receiving identification of the specific distance from the first user device.

In some implementations, receiving the information from the first user device identifying the geographical area may include receiving a geolocation. Receiving the geolocation may include receiving an internet protocol address. Receiving the geolocation may include receiving geographical coordinates. Receiving the geolocation may include receiving a zip code.

In some implementations, serving the instructions for the presentation of the composite user interface to the second user device may include serving the instructions for the presentation of the composite user interface to a mobile device. Receiving the information from the first user device may include receiving the information from a desktop computer or a laptop. The method may include terminating the searching and the serving upon detection of a request from the second user device or a determination that a maximum time period has been reached. Receiving the information from the first user device may include receiving the maximum time period.

In some implementations, receiving the information from the server identifying (a) the requested commerce object for which available inventory is sought, and (b) the geographical area may include receiving, from the server, a message that includes the information formatted according to a message format from an application programming interface. Serving, for each of the groups of search results, the group of search results to the server may include providing, to the server for each of the groups of search results, a response message that includes data for the search results in the group of search results formatted according to a second message format from the application programming interface.

In some implementations, receiving the information from the server identifying (a) the requested commerce object for which available inventory is sought, and (b) the geographical area may include receiving, from the server, a message indicating (a) a commerce object for which a first user device requested inventory information, and (b) the geographical area in which the first user device is located. Serving, for each of the groups of search results, the group of search results to the server may include providing, to the server for each of the groups of search results, the group of search results to cause the server to provide the group of search results to a second user device, different from the first user device, for presentation in a composite user interface. Serving, for each of the groups of search results, the group of search results to the server may include providing, to the server for each of the groups of search results, the group of search results to cause the server to provide the group of search results to the first user device for presentation in a composite user interface.

In some implementations, receiving the information from the server identifying (a) the requested commerce object for which available inventory is sought, and (b) the geographical area may include receiving, from the server, a message indicating (a) a commerce object for which a first user device requested inventory information, and (b) the geographical area specified by the first user device in which the commerce object may be purchased. Serving, for each of the groups of search results, the group of search results to the server may include providing, to the server for each of the groups of search results, the group of search results to cause the server to provide the group of search results to a second user device, different from the first user device, for presentation in a composite user interface. Serving, for each of the groups of search results, the group of search results to the server may include providing, to the server for each of the groups of search results, the group of search results to cause the server to provide the group of search results to the first user device for presentation in a composite user interface.

In some implementations, asynchronously receiving and aggregating search results into groups as the search results become available to form a respective composite user interface may include asynchronously receiving and aggregating search results into groups as the search results become available to form a respective composite web page. Receiving the information from the server may include receiving identification of the specific distance. The method may include receiving identification of the specific distance from the server.

In some implementations, receiving the information from the server identifying the geographical area may include receiving a geolocation. Receiving the geolocation may include receiving an internet protocol address. Receiving the internet protocol address may include receiving an internet protocol address of a user device that requested available inventory information for the commerce object and for which the data processing apparatus received the information from the server. The method may include terminating the searching and the serving upon detection of a request from the server or a determination that a maximum time period has been reached. Receiving the information from the server may include receiving the maximum time period.

The subject matter described in this specification may be implemented in various implementations to realize one or more of the following potential advantages. In some implementations, an inventory system can provide inventory information for multiple vendors to a user. In some implementations, an inventory system can receive product inventory information directly from a system for a retail location. In some implementations, an inventory system may combine manual product inventory information with data from an inventory database. In some implementations, asynchronous receipt of the search results from the plurality of services allows an inventory system to create a group of search results as search results from different systems, for different retail locations, or both, become available. In some implementations, an inventory system may provide search results to a mobile device so a user may access the search results while away from his home or office, e.g., when at a mall. In some implementations, an inventory system may provide search results to a mobile device after completing a lengthy search process so the mobile device may present the search results to a user as the search results become available, e.g., without making the user wait at a particular location to receive the search results. For instance, the particular location may include a desktop computer from which the inventory system receives an initial search request for the user. In some implementations, the use of multiple databases and a central communication server allows vendors to maintain their own individual inventory systems while providing inventory data to the central communication server for use in a product inventory search. In some implementations, the use of an application programming interface (API) allows third party systems to receive product inventory information from a central communication server when the product inventory information indicates inventory data from multiple databases, manual-assisted searching, or both.

Details of one or more implementations are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a central communication server may automatically search local inventory availability for vendor retail locations on behalf of a consumer, aggregate results from disparate inventory systems and manual inventory entry, and provide the results asynchronously to a device operated by the consumer. For instance, rather than have the consumer call multiple different retailers to determine which particular vendor retail locations have a product in stock, the central communication server accesses databases for some retailers and may request a manual inventory inquiry for other retailers and provides inventory information to the consumer.

The consumer may request the inventory information from the central communication server using a first device, e.g., a wired computer, and view the results using a second device, e.g., a mobile device. For example, the consumer may search for a television using their desktop computer, request information from a central communication server about what retail locations have the television in stock, and then receive and view inventory information on his smart phone from the central communication server, e.g., via text messaging or a mobile application.

The central communication server may retrieve the inventory information from a central server, from multiple servers that are each maintained for a particular retailer, from a device for an entity, e.g., a person or a robot, physically located at a retail location, or a combination of any two or more of these. The inventory information is for multiple different retailers that each may have the requested product, e.g., television, in stock. The inventory information may include stock levels, e.g., when the consumer requests multiple of the same product.

When an entity performs a determination of whether or not a particular item is in stock, or the amount of inventory in stock, the entity may use a bar code scanner, a mobile device, e.g., with an inventory application, or another method. In some examples, the central communication server may receive data from the device operated by the entity indicating that the particular item is not in stock but one or more comparable items are in stock. The central communication server may then provide the consumer with information about the one or more comparable items.

Figure 1:
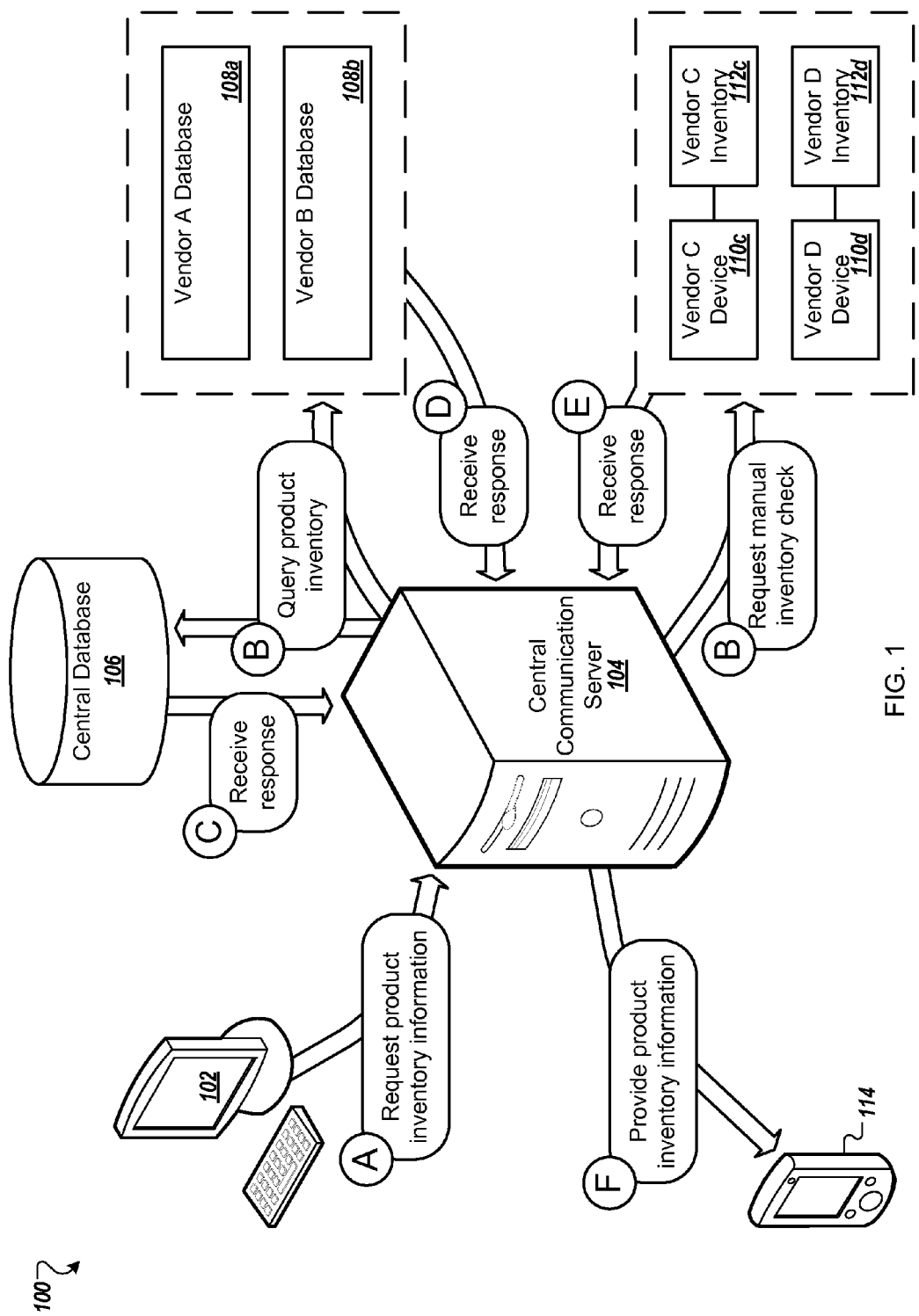
FIG. 1 is a block diagram of an example environment configured to aggregate inventory data from multiple sources.

FIG. 1 is a block diagram of an example environment 100 configured to aggregate inventory data from multiple sources. For instance, a first device 102 sends a request for product inventory information to a central communication server 104 at time $T_A$. The request may be for a specific product, or type of product, e.g., brand or product category, such as 36 inch televisions.

The central communication server 104 receives the request and, during time period $T_B$, queries multiple databases, e.g., a central database and vendor databases 108a-b, to determine which vendors have the specific product or type of product in their inventory. Optionally during time period $T_B$, the central communication server 104 may also send a request for a manual inventory inquiry to one or more vendor devices 110c-d. For instance, the central communication server 104 may request that an employee of Vendor C and an employee of Vendor D determine whether the Vendor C's inventory 112c and the Vendor D's inventory 112d, respectively, contain the specific product or type of product. Each of the requests and queries sent during time period $T_B$ is sent at substantially the same time, e.g., in parallel, and are sent in response to the request for product inventory information received at time $T_A$. In some examples, some of the requests or queries are sent at substantially the same time and other requests or queries are sent at a different time during the time period $T_B$. For instance, the central communication server 104 may send a first product inventory query to the Vendor A database 108a at night and, once the Vendor C retail location opens the next morning, the central communication server 104 may send a manual inventory inquiry request to the Vendor C device 110c.

The central database 106 includes information about inventories of multiple vendors, potentially including some of Vendors A-D. The central database 106 may be integrated with the inventory systems of the vendors, e.g., using automated data integration. For instance, when there is an update to the Vendor A database 108a, the central database 106 may receive information about the update from the Vendor A database 108a, e.g., a single update for a particular product when the inventory for that particular product changes or as an update for multiple items, potentially a while after the inventories of one or more of the products has changed. The central database 106 may be included on the same physical devices as the central communication server 104 or may be included in different physical devices.

The central database 106 determines whether a particular vendor retail location has inventory of the specific product or type of product. For example, the central database 106 uses a product identifier as input to a query to determine which vendor retail locations have the specific product in stock and are within a particular geographical area of the first device 102 or another location specified by a user operating the first device 102, e.g., when the user will be at another location away from the first device 102 later that day or week.

During time period $T_C$, the central communication server 104 receives one or more results from the central database 106 that each identify the particular vendor retail locations that have the specific product or type of product in inventory and are within the particular geographic area. The central communication server 104 may receive one response that identifies all of the results or may receive multiple responses that each identify one or more of the particular vendor retail locations. For example, the central database 106 may perform an initial search and provide the central communication server 104 with a first response, receive an inventory update for some of the vendors for which the central database 106 stores inventory data, and perform a subsequent search and provide the central communication server 104 with a second response that identifies different vendor retail locations than the first search.

In some examples, the second response may override the first response. For instance, when the inventory update indicates that one of the particular vendor retail locations no longer has the specific product in stock, the central communication server 104 may receive the second response from the central database 106 that indicates that the one of the particular vendor retail locations no longer has the specific product in stock. The second response may identify only the one of the particular vendor retail locations that no longer has the specific product in stock or may identify all of the other particular vendor retail locations that have the specific product in stock, potentially including additional vendor retail locations that received an inventory of the specific product after the central communication server 104 received the first response.

The Vendor A-B databases 108a-b are each databases that store inventory information for only one vendor, potentially for multiple physical retail locations for each of those vendors. One or both of the Vendor A-B databases 108a-b may be proprietary databases that include inventory information. Each of the Vendor A-B databases 108a-b receive the product inventory request, during time period $T_B$, from the central communication server 104 and determine whether the specific product or type of product is in stock. For example, the Vendor A database 108a may use an identifier for the specific product to determine which retail locations for the Vendor A, within the particular geographic area, have the specific product in stock.

The central communication server 104 receives responses from each of the Vendor A-B databases 108a-b during time period $T_D$. For instance, the central communication server 104 may receive a first response from the Vendor B database 108b and then later receive a second response from the Vendor A database 108a. The central communication server 104 may, for example, receive the second response minutes or hours after receiving the first response.

The central communication server 104 determines which of the Vendor C-D devices 110c-d are located within the particular geographic area or are associated with the particular geographic area, e.g., when the Vendor C retail location is within the particular geographic area and, during time period $T_B$, sends a request for a manual inventory inquiry to the determined devices. The central communication server 104 may send the request for the manual inventory inquiry to vendors which do not have electronic inventory databases or which have electronic inventory databases that are not integrated with the central communication server 104.

For instance, the central communication server 104 determines that the Vendor C device 110c is a computer physically located at a retail location within the particular geographic area, that the Vendor D device 110d is a mobile device currently at and associated with another retail location within the particular geographic area, and sends the request to both the Vendor C-D devices 110c-d. The central communication server 104 may determine that another Vendor D device (not shown) is associated with the other retail location but is not currently at the retail location, e.g., using opt-in location tracking information, and not send the request to the other Vendor D device.

The Vendor C-D devices 110c-d each receives a respective request and prompt an entity to perform a manual search for the specific product or type of product. For instance, when the Vendor D device 110d is a smart phone, a text messaging application or an inventory application may prompt an employee of the Vendor D who is operating the smart phone to manually check the Vendor D's inventory 112d for the specific product or type of product. The smart phone may receive input from the employee indicating whether or not the product is in stock, the amount of the product at the Vendor D retail location, if the Vendor D retail location has any comparable products in stock, or a combination of two or more of these.

For instance, the smart phone may receive input indicating that the current inventory of the specific product is zero, e.g., not in stock, or one or more, e.g., in stock. The input may be received by the text messaging application or in a particular field of a smart phone application. The smart phone application may have additional fields that allow the receipt of input indicating whether or not a comparable product is in stock and, potentially, some of the features of the comparable product.

In some examples, one or more of the Vendor C-D devices 110c-d may be included in an automated search device, e.g., a robot. The robot may receive the request for a manual inventory inquiry, determine where the specific product is typically located in the retail location, and scan bar codes of products at the retail location to determine whether or not the specific product is in stock.

The central communication server 104, during time period $T_E$, receives responses from the Vendor C-D devices 110c-d indicating whether or not the specific product or type of product is in the Vendor C-D inventory 112c-d, respectively.

The central communication server 104 aggregates one or more of the responses received during the time periods $T_C$, $T_D$, and $T_E$ and, during time period $T_F$, provides product inventory information to a second device 114. For instance, the central communication server 104 may receive responses from the central database 106 and the vendor B database 108b and provide a first set of result information to the second device 114 and then receive responses from the Vendor D device 110d and the Vendor A database 108a and provide a second set of result information to the second device 114.

The second device 114 may present the result information in a user interface, e.g., a text messaging user interface or a mobile application user interface. For instance, the second device 114 may include an inventory application specific to the central communication server 104 that allows the second device 114 to receive search results from the central communication server 104 and present the search results to a user, e.g., the same user who requested the search results with the first device 102.

The central communication server 104 provides the search results to the second device 114 based on settings associated with the second device 114. For instance, the user of the second device 114 may indicate that they should receive only one update from the central communication server 104 per hour or per day and the central communication server 104 provides results to the second device 114 using this information.

One or more of the time periods $T_B$, $T_C$, $T_D$, $T_E$, and $T_F$, may overlap. For instance, the central communication server 104 may send a second request for a manual inventory inquiry to the Vendor C device 110c, receive a response from the Vendor A database 108a, provide first product inventory information to the second device 114, receive a response from the Vendor C device 110c, and then provide second product inventory information to the second device 114.

In some implementations, the central communication server 104, the central database 106, or both, may filter a list of potential vendors, vendor retail locations, or both using data that indicates which products or types of products are available or historically have been available at particular vendors or vendor retail locations. For instance, the central communication server 104 may determine that a particular vendor does not stock a particular product or the brand of the particular product and determine that a query should not be sent to the central database 106 for that particular vendor, should not be sent to that particular vendor's databases, or both.

The first and second devices 102 and 114 may include personal computers, mobile communication devices, and other devices that can send and receive data over a network (not shown). The network, such as a local area network (LAN), wide area network (WAN), the Internet, or a combination thereof, may connect the first and second devices 102 and 114, the central communication server 104, the databases 106 and 108a-b, the vendor devices 110c-d, or any two or more of these devices together.

Figure 2:
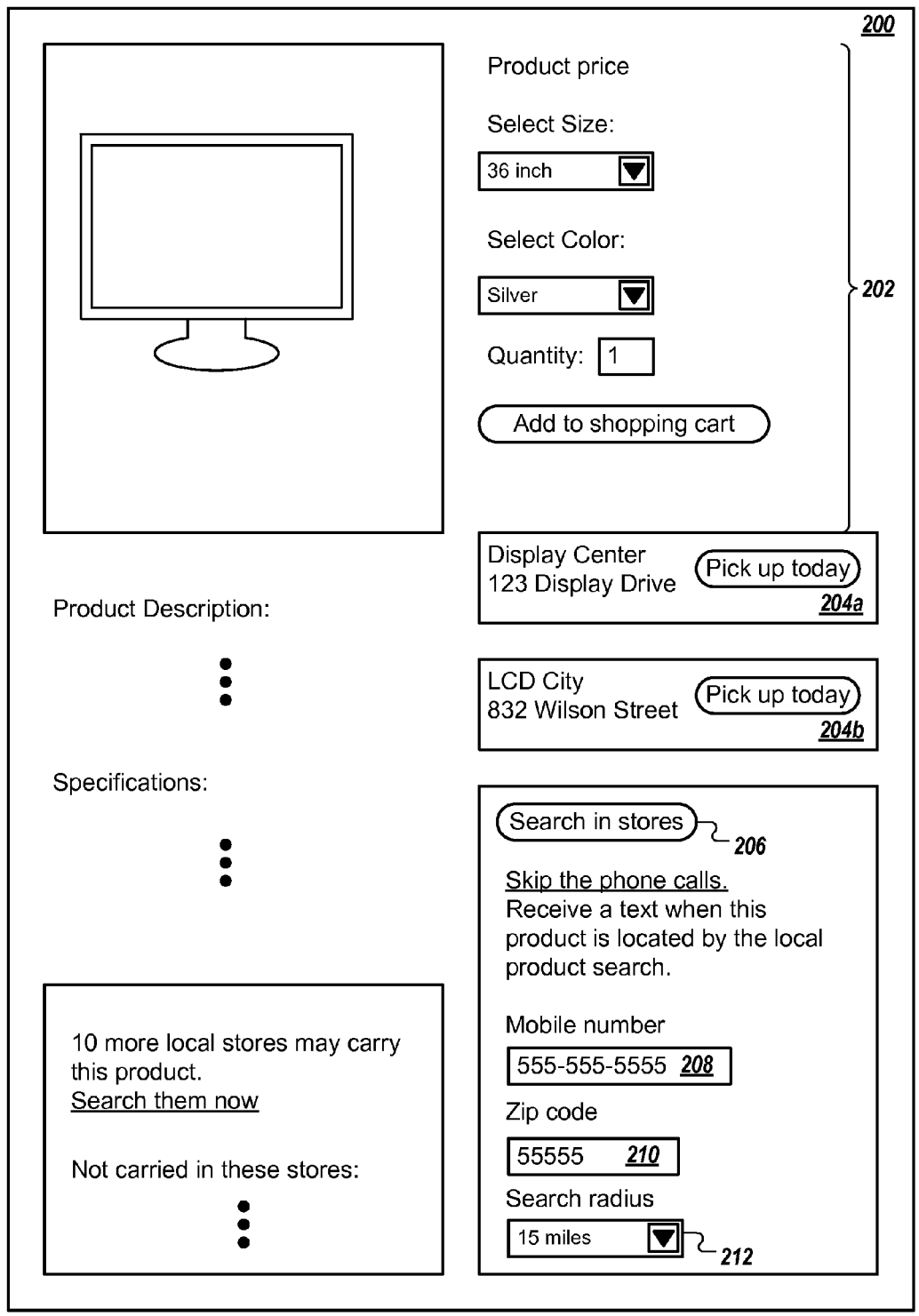
FIG. 2 is an example of a user interface for presenting product information.

FIG. 2 is an example of a user interface 200 for presenting product information. For instance, the first device 102 may present the user interface 200 to a user, e.g., in response to a request for information about a specific product or type of product.

The user interface 200 includes product information 202 such as the price of the specific product, the size of the specific product, and the color of the specific product. The user interface 200 includes an option to add a particular quantity of the product to a shopping cart and an option 204a-b to pick up the specific product at a particular retail location.

The user interface 200 includes inventory information for multiple different vendors. For example, the user interface 200 includes a first option 204a to pick up the specific product at "Display Center" and a second option 204b to pick up the specific product "LCD City," a different vendor.

A search in stores option 206 allows a user to receive updates of which retail locations have the specific product in stock. For instance, the user interface 200 may receive a mobile number from a mobile number filed 208 and, in response to selection of the search in stores option 206, provide search results to a mobile device to allow the mobile device to present the search results to the user. Selection of the search stores option 206 may provide the central communication server with information about the product presented in the user interface and the mobile number. In some implementations, the central communication server may receive product quantity information in response to selection of the search stores option 206, e.g., when the user will purchase one or more of the same product.

The inventory information presented in the user interface 200 includes some local inventory information, e.g., determined using the central database 106, but does not include local inventory information for all vendors, all vendor retail locations, or both. For instance, the user interface 200 may include local inventory information for two retail locations and selection of the search in stores option 206 may provide the user with local inventory information for more vendors, more vendor retail locations, or both.

In some implementations, the user interface 200 may include a zip code field 210, a search radius field 212, or both. For instance, the user interface 200 may allow the user to enter their current location or a location she will be at in the future, e.g., when she plans to pick up the specific product, and the central communication server 104 uses that location information to determine a geographic area for which retail locations inventory information should be determined. In some examples, the central communication server 104 may use the internet protocol address of the first device 102, device geo-location information, or other location information to determine the geographic area.

In some implementations, the central communication server 104 may use the location data to display, e.g., in the user interface 200, inventory results for retail locations within a search distance radius where the inventory is already available in the central database 106, e.g., a real-time database. In some implementations, the search in stores option 206 allows the user to request an inventory search for retail locations for which inventory information was not readily available during the presentation of the user interface 200. For instance, the central communication server 104 may provide inventory information in the user interface 200 retrieved from the central database 106 but not provide inventory information in the user interface 200 for vendors or vendor retail locations for which the central database 106 does not have inventory information, e.g., the Vendors A-D shown in FIG. 1.

Figure 3:
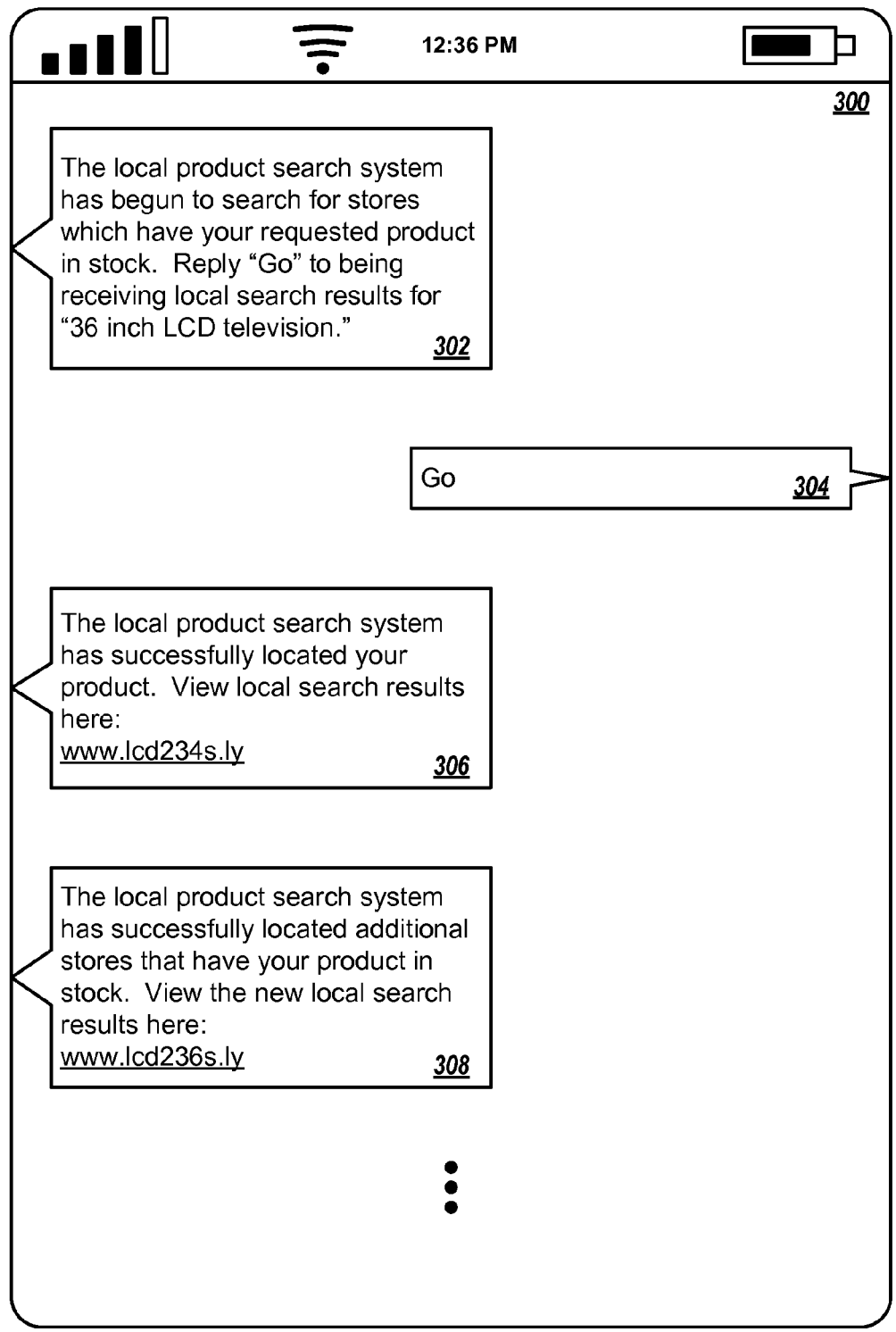
FIG. 3 is an example of a mobile device user interface for displaying inventory search results.

FIG. 3 is an example of a mobile device user interface 300 for displaying inventory search results. For instance, the mobile device may receive search results from the central communication server 104 as the search results become available and present the search results in the mobile device user interface 300.

The mobile device receives first instructions from the central communication server 104, or another server, for presentation of a confirmation message 302 that confirms that the user of the mobile device would like to receive product inventory updates. The confirmation message may be for a specific product or for receiving product inventory updates in general, e.g., the first time the mobile device receives information from the central communication server 104.

In response to the presentation of the confirmation message, the mobile device may receive input 304 indicating that a user of the mobile device would like to receive product inventory updates on the mobile device. For instance, when the confirmation message indicates that a response of "Go" opts in to receiving product inventory updates, the mobile device may receive data indicating user input 304 of "Go," e.g., through a software or hardware keyboard or voice input.

Once the mobile device provides the central communication server 104 with an indication that the mobile device should receive product inventory updates, the mobile device will periodically receive data from the central communication server 104 and use the data to present messages about product inventory updates on a display. For example, the mobile device will present a first message 306 with a link for a first search results user interface. When the mobile device receives input indicating selection of the link, the mobile device generates the first search results user interface and displays the search results user interface on the display, e.g., as part of a web browser application or another application on the mobile device. The search results identify one or more retail locations that have inventory of the specific product or type of product requested by the user.

The first message 306 may indicate that the central communication server 104 is still determining whether other retail locations may have inventory of a specific product or type of product, identified in the confirmation message 302, and may provide additional search results to the mobile device at a later time. For instance, the first message 306 may include a note stating "The local product search system is still searching for your requested product and may provide additional results."

After presentation of the first message 306, the mobile device may receive additional data from the central communication server 104 and present a second message 308 with another link. Upon receipt of input indicating selection of the other link, the mobile device may present additional search results for the specific product or type of product in a second search results user interface. The additional search results may be cumulative, e.g., and include search results presented in the first search results user interface. In some examples, the additional search results may only include new retail locations that were not identified in the first search results user interface.

Figure 4:
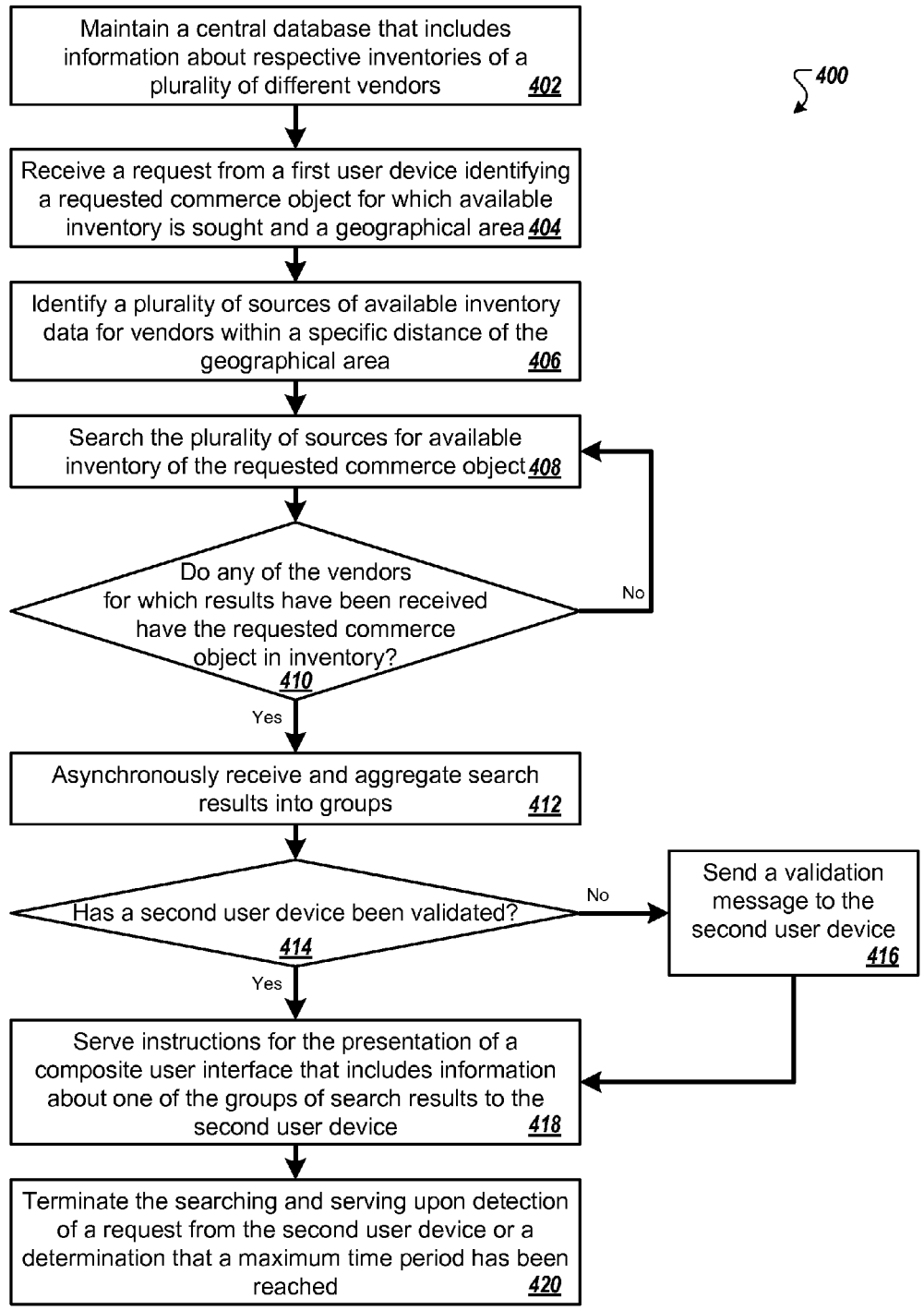
FIG. 4 is a flow diagram of a process for providing a mobile device with product inventory updates.

FIG. 4 is a flow diagram of a process 400 for providing a mobile device with product inventory updates. For example, the process 400 can be used by the central communication server 104 from the environment 100.

The process maintains a central database that includes information about respective inventories of a plurality of vendors (402). For instance, the central communication server receives inventory information from systems for each of the plurality of vendors. The inventory information may include current inventory levels for particular products or types of products typically offered by a particular vendor or vendor retail location, e.g., brand or product line or both. In some implementations, the inventory information may include historical inventory data that indicates which products, types of products, brands, or any two or more of these that particular vendors, vendor locations, or both, have carried.

The process receives a request from a first user device identifying a requested commerce object for which available inventory is sought and a geographical area (404). For example, the central communication server receives the request from the first user device operated by a particular user. The first user device may be a desktop computer, a laptop, or a tablet to name a few examples.

The process identifies a plurality of sources of available inventory data for vendors within a specific distance of the geographical area (406). For instance, the central communication server searches the central database, or another database, for vendor retail locations to contact regarding product inventory information for the requested commerce object. Some of these vendor retail locations may have inventory data available in real-time, e.g., stored in a database. Some of these vendor retail locations might not have inventory data available in real-time, e.g., the inventory data is stored in a database that is not updated as products are sold or is not stored in a database.

The central communication server determines which vendor retail locations are within the desired search radius. For example, the central communication server uses the geographical area, e.g., zip code or an area associated with an internet protocol address of the first device, and a search radius centered on that geographical area, e.g., predetermined or specified by the particular user, to determine which vendor retail locations the particular user may visit for the requested commerce object.

In some examples, the central communication server categorizes the determined vendor retail locations into three groups. A first group of vendor retail locations may have inventory data available in real-time. A second group may have no inventory of the requested commerce object. A third group might not have real-time inventory data.

In some implementations, the central communication server may use a safety stock level when determining inventory information for vendor retail locations for which real-time inventory data is available. For instance, the central communication server, or another server, may determine two safety stock levels: a first for the particular vendor retail location and a second for the brand or type of the requested commerce object. The safety stock level may be an additional amount of inventory maintained for a retail location or a product to ensure that demand for commerce objects offered by the retail location is met. The central communication server may use the maximum of the two safety stock levels when determining a stock level for the requested commerce object.

In some implementations, for vendor retail locations in the third group for which real-time inventory data is not available, the central communication server, or another server, may filter out some of these vendor retail locations using information about product distribution or products offered by the vendor retail locations, e.g., historical data.

For instance, the central communication server may maintain a list of products distributed to each of the vendor retail locations, e.g., all vendor retail locations or only the vendor retail locations in the third group. The list may indicate particular products, types of products, brands of products, or any two or more of these, that the vendor retail locations receive. For example, when a brand of the requested commerce object is never distributed to a certain vendor retail location, the central communication server may place that certain vendor retail location in the second group of vendor retail locations which do not have the requested commerce objet in inventory. The central communication server places any remaining vendor retail locations, e.g., which have received the brand, type of product, the requested commerce object, or two or more of these, in the past, in the third group of vendor retail locations.

The process searches the plurality of sources for available inventory of the requested commerce object (408). For instance, the central communication server queries each of the vendor retail locations in the first group, the third group, or both, to determine whether those vendor retail locations have the requested commerce object. The query may be sent to a computer associated with the vendor retail location, may include a telephone call to a phone at the vendor retail location, or any other appropriate method to determine inventory of the requested commerce object. Some examples of the searching the plurality of sources for available inventory of the requested commerce object are described in more detail below.

The central communication server may determine contact information for each of the vendor retail locations in the first group and the third group. The contact information is specific to each of the vendor retail locations and preferences for the vendor retail locations that indicate how the vendor retail location should be contacted for an inventory inquiry.

The contact information for each vendor retail location in the first group may be the address of a device to which the central communication server may send an inventory request. The address may be for the central database or for another database. The central communication server sends the request to the address and may receive a response indicating whether or not the respective vendor retail location has the requested commerce object in inventory. In some examples, the central communication server may send a single request for multiple vendor retail locations, e.g., when a single database includes inventory information for each of the multiple vendor retail locations.

For the vendor retail locations in the third group, the central communication server may determine the days and hours of operation, e.g., whether or not an entity at each of the vendor retail locations in the third group may respond to the inventory inquiry. The central communication server may place any vendor retail locations that are currently not open in the second group. In some examples, the central communication server may determine that some of the vendor retail locations in the third group will be open within a maximum search time period, and wait to send an inventory inquiry to those vendor retail locations once the respective vendor retail locations are open.

In some implementations, the central communication server may discard any vendor retail locations that do not have valid contact information or place those vendor retail locations in the second group.

The process determines whether any of the vendors for which results have been received have the requested commerce object in inventory (410). For example, the central communication server receives responses to the inventory inquiry for the vendor retail locations. The central communication server might not receive a response for each of the vendor retail locations. The central communication server may receive multiple responses for a single vendor retail location, e.g., as inventory of the requested commerce object changes.

The central communication server receives the responses over time. For instance, the central communication server may receive a first response, a second response five minutes later, and a third response two hours after receiving the first response.

If none of the vendors for which results have been received have the requested commerce object in inventory, and the process has not determined to terminate the searching, the process continues to search the plurality of sources for available inventory of the requested commerce object (408).

If at least one of the vendors for which results have been received has the requested commerce object in inventory, the process asynchronously receives and aggregates search results into groups (412). For example, the central communication server determines preferences for the first user device, e.g., the specific user who initiated the search for the requested commerce object, to determine a frequency at which the central communication server should provide search results to a second use device. The preferences may include a minimum time between messages, a maximum search time period, or how the central communication server should aggregate search results, to name a few examples.

The central communication server may determine when the most recent message was sent to the second user device and, using the minimum time period between messages, that the central communication server may send another message. In some examples, the central communication server may determine that the minimum time period between messages has not passed and wait to aggregate additional search results together until the minimum time period has passed. In some examples, if the central communication server receives a response for a vendor retail location after the maximum search time period has passed, e.g., and the user no longer wants search results, the central communication server may discard that response.

The process determines whether a second user device has been validated (414). The second user device is operated by the same user, or otherwise associated with the same user, as the first user device. In some examples, the central communication server may validate the second user device to ensure that a user executed the search for the requested commerce object, opts-in to receive search results on the second user device from the central communication server, or both.

If the second user device has not been validated, the process sends a validation message to the second user device (416). For instance, the central communication server may send a message to the second user device prompting a user to enter input indicating that they requested the search for the commerce object and corresponding search results should be sent to the second user device. One example of a validation message may include the confirmation message 302.

If the central communication server receives a response from the second user device indicating that the user does not want to receive the search results, the process 400 ends. In some examples, if the central communication server does not receive a response from the second user device within a predetermined period of time, the process 400 ends. If the central communication server receives a response from the second user device within the predetermined period of time and confirmation that the second user device should receive search results, the process proceeds to step 418.

If the second user device has been validated previously, or once the second user device has been validated, the process serves instructions for the presentation of a composite user interface that includes information about one of the groups of search results to the second user device (418). For example, the central communication server provides instructions for the presentation of the search results to the second user device. The central communication server may format the search results, and instructions for the presentation of the search results, based on user preferences. The search results may be provided to the user using text messaging or mobile push, e.g., using an application installed on the second user device.

The process terminates the searching and serving upon detection of a termination request from the second user device or a determination that a maximum search time period has been reached (420). For example, when the central communication server receives a request from the second user device to stop providing search results to the second user device, e.g., a "stop" message, or determines that the maximum search time period has ended, the central communication server stops searching for additional inventory of the requested commerce object and sending the search results to the second user device.

In some examples, the central communication server may access the list of vendor retail locations being searched, e.g., the first and third groups, to determine whether responses have been received from each of the vendor retail locations. A response may indicate that the respective vendor retail location has the requested commerce object in inventory, a specific inventory level, or that the respective vendor retail location does not have the requested commerce object in inventory. Once the central communication server receives a response for each of the vendor retail locations, the central communication server terminates the searching and serving of search results.

In some implementations, after the termination of the searching and servicing, the central communication server may provide the second user device with a summary of the search results. For example, when the central communication server receives an update for a particular vendor retail location, the summary may indicate the updated inventory information, e.g., indicating that the particular vendor retail location no longer has the requested commerce object in inventory or has received inventory of the requested commerce object. For instance, the central communication server may request inventory information and indicate in the request that updating indicating changes to the inventory information for the vendor retail location should be provided to the central communication server for the next twenty-four hours, or another time period.

The order of steps in the process 400 described above is illustrative only, and providing the mobile device with the product inventory updates can be performed in different orders. For example, the second user device may be validated prior to receiving a request from the first user device.

In some implementations, the process 400 can include additional steps, fewer steps, or some of the steps can be divided into multiple steps. For example, the central communication server may perform multiple steps, some of which are described below, when searching the plurality of sources for available inventory of the requested commerce object. In some examples, the first user device and the second user device are different devices. In some examples, the first user device and the second user device are the same device.

In some implementations, the central communication server repeats steps 408 through 412 and 418 until search results have been received from all sources, the central communication server receives a request from a device operated by the user to terminate the search, or the maximum search time period has been reached. In some implementations, the first device is operated by a first user and the second device is operated by a second user. For instance, a husband may use the first device to request available inventory information for the commerce object and the central communication server may provide search results to the second device operated by the wife.

In some implementations, the central communication server may communicate with another server to perform some or all of the process, instead of or in addition to communicating with the first user device, the second user device, or both. For example, the central communication server may communicate with the other server for one or more of steps 404, 414, 416, 418, and 420.

In some examples, the central communication server may use an application programming interface (API) to communicate with the other server. For instance, the other server may use a method or a message format from the API to provide the central communication server with a request message about the requested commerce object for which available inventory is sought and the geographical area in which inventory information is requested. The request message may include information about a consumer or a device requesting the inventory information.

The central communication server uses one or more steps of the process 400, e.g., steps 406 through 412, to determine at which vendor retail locations the requested commerce object is available. For instance, the central communication server parses information from the request message to determine the requested commerce object and the geographical area.

The central communication server may asynchronously receive and aggregate search results into groups and provide a group of search results to the other server, e.g., using another method or another message format from the API. The central communication server may provide the other server with a response message that includes information about the group of search results, e.g., a list of retailer locations that have the requested commerce object in inventor and the physical locations of those retail locations.

The central communication server may provide the other server with a single response message for a group of search results or with multiple response messages, each of which contain data for at least one search results. For example, the central communication server may wait a predetermined period of time, e.g., two to five hours, and send the other server a first response message with data for one or more search results, wait another duration of the predetermined period of time and send the other server a second response message with data for one or more additional search results, and so on.

In some examples, the central communication server may send the other server a response message when a predetermined number of search results have been determined. For example, the central communication server may use the API to send a response message to the other server for every group of five or six search results. When the central communication server determines that no additional search results for retail locations are likely to be determined, the central communication server may send any remaining search results to the other server.

The other server may use the response messages to provide a user device with the search results. For instance, when the other server receives a request for inventory information for the requested commerce object from the user device, the other server may send the request message to the central communication server.

When the other server receives a response message from the central communication server, the other server may store the response message in a memory. The other server may wait to send a response to the user device, or another user device, until a predetermined period of time has passed, a predetermined quantity of search results have been received from the central communication server, or both. The other server may provide the search results to the user device periodically, e.g., in response to receipt of the search results from the central communication server. For example, the other server may receive a response message from the central communication server and provide the search results from the response message to the user device.

In some implementations, the other server may receive a request for inventory information from a first user device and provide search results to a second user device. For instance, the other server may receive a request from a desktop, a laptop, or a tablet and provide search results to a mobile device, e.g., associated with a same user as the first user device.

The other server may host a search engine, a website for a manufacture or a product provider, or another type of website. The central communication server allows the other server to provide product inventory information to one or more users that request the product inventory information, e.g., for different products, from the other server. The central communication server and the other server may use any appropriate method or message formats to communicate over a network.

Figure 5:
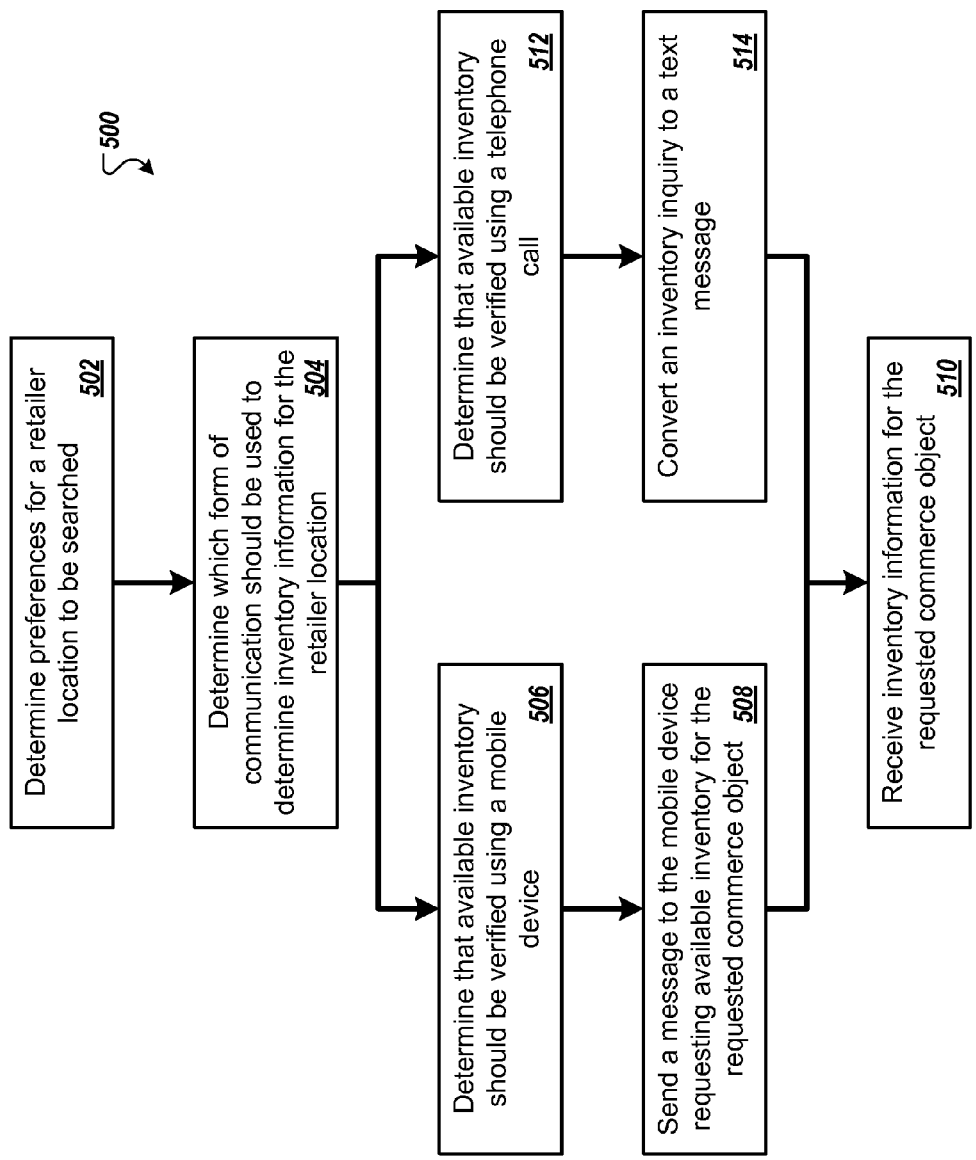
FIG. 5 is a flow diagram of a process for searching a plurality of sources for available inventory of a requested commerce object.

FIG. 5 is a flow diagram of a process 500 for searching a plurality of sources for available inventory of a requested commerce object. For example, the process 500 can be used by the central communication server 104 from the environment 100. The central communication server, or another device, may check the inventory of each of the sources in parallel, e.g., as independent processes. The central communication server, or the other device, receives results for the search over time, e.g., because of the asynchronous nature of communication with the sources. In some examples, the central communication server 104 uses the process 500 for a manual inventory inquiry.

The process determines preferences for a vendor retail location to be searched (502). For example, the central communication server determines the inventory confirmation process for the vendor retail location, e.g., what device or person for the vendor retail location the central communication server should contact.

The process determines which form of communication should be used to determine inventory information for the vendor retail location (504). For instance, the central communication server uses the preferences to determine whether to send a message to a device at the vendor retail location or initiate a telephone call with a telephone for the vendor retail location.

The process determines that available inventory should be verified using a mobile device (506). For instance, the central communication server may receive a registration request from the mobile device of an employee of the vendor retail location. The registration request may be from a mobile application installed on the mobile device to allow the mobile application to receive event messages from the central communication server, e.g., inventory availability requests. Upon receiving the registration request, the central communication server associates the mobile device with the vendor retail location so that the central communication server may later send requests to the mobile device for inventory availability at the vendor retail location.

In some implementations, the central communication server may send messages to the mobile device using a notification service of the mobile device, a specific inventory application installed on the mobile device, or both. In some implementations, the central communication server may validate the mobile device to ensure that the mobile device should be associated with the vendor retail location.

The process sends a message to the mobile device requesting available inventory for the requested commerce object (508). For instance, the central communication server may send the message to the mobile device's notification system, to a specific inventory application installed on the mobile device, or both. For instance, the central communication sever may verify that it can send push notifications to the mobile device and provide the message to the mobile device. In some examples, the central communication server may send a message to a non-mobile device, e.g., a desktop computer.

A user of the mobile device, e.g., the employee of the vendor retail location, may then view content from the message on the mobile device. For instance, the mobile device may present an inventory inquiry page to the user. The inventory inquiry page may be presented in a web browser or in an interface of the mobile application, e.g., in response to selection of a pop-up on the mobile device.

In some implementations, the central communication server or another system may filter which devices for a vendor retail location receive the message, e.g., and not send the message to all of the devices. For example, when a particular retailer system is associated with five mobile devices, one for each of five different employees of the particular retailer, the system may determine which of the five mobile devices should receive the message or if all five of the mobile devices should receive the message. In some examples, preferences for the retailer system may indicate that only one of the five mobile devices should receive the message, e.g., based on a ranking of the five mobile devices. If the central communication server does not receive a response from the selected mobile device, e.g., highest ranked mobile device, within a predetermined period of time, the central communication server or another system may provide the message to another of the five devices, e.g., the second ranked device, and so on until the central communication server receives a response.

The mobile device receives input from the user indicating whether or not the retail location has inventory for the requested commerce object. For instance, the mobile device may receive input indicating an inventory quantity for the requested commerce object, e.g., "0," "1," or "2." In some examples, the mobile device may receive input indicating "yes" or "no" for the inventory. The central communication server may use the inventory level when a search request, or multiple search requests, is for more than one of the requested commerce object.

In some implementations, the mobile device may receive input from a scanner or a camera indicating the inventory for the requested commerce object. For instance, the employee may scan the requested object's barcode to indicate that the product is in stock or enter input, e.g., "no," to indicate that the requested object is not in stock.

In some examples, the mobile device may receive input indicating alternative products that are similar to the requested commerce object. The central communication server may receive information about the alternative products in addition to or instead of inventory information for the requested commerce object, e.g., when both products are in stock or only the alternative product. For instance, the central communication server may receive a photo, barcode information, or both, for the alternative products from the mobile device.

In some implementations, an inventory search, for a particular user or for multiple users, may be for more than one commerce object. For example, the particular user may have asked for inventory information for each of multiple products, e.g., in a single request or multiple requests. When the central communication server receives multiple requests for a single user, the central communication server may use preferences for that user to determine whether search results for each of the different products may be presented on a single interface. In some examples, the central communication server may determine that different users each requested inventory information for a single commerce object, but a single retail location may have inventory of each of the commerce objects for each of the different users.

The mobile device may prompt the user of the mobile device for inventory information for each of the products until the mobile device has inventory information for all of the products. The inventory information may indicate that some of the products are in stock but not all of the products, that all of the products are in stock, or that none of the products are in stock.

Once the mobile device has inventory information for all of the products, the mobile device presents an interface to the user indicating that the search is complete. In some examples, the results of the inventory search for all of the products may be presented on an interface to the user, e.g., as a summary.

In some implementations, the mobile device is specific to the vendor retail location, e.g., is owned by the vendor retail location and not specific to any particular employee of the vendor retail location. The central communication server may determine the hours and days of operation before sending a message to a mobile device that is specific to the vendor retail location, e.g., as no employees may be at the vendor retail location outside of business hours. In some examples, the central communication server determines the hours and days for which employees are working at the vendor retail location and sends the message to the mobile device during those hours, e.g., when an employee is working in the stock room but the vendor retail location is not open.

The process receives inventory information for the requested commerce object (510). For instance, the central communication system receives the results of the search for the single requested commerce object or the multiple commerce objects.

In some implementations, the process determines that available inventory should be verified using a telephone call (512). For instance, the central communication server may determine that an automated telephone call should be placed with the vendor retail location to determine the available inventory of the requested commerce object.

The central communication server may update a status of an inventory inquiry for the vendor retail location to indicate that a telephone call is in progress. The central communication server, or another device, automatically calls a telephone number associated with the vendor retail location. The central communication server may continue dialing the telephone number, e.g., after an initial call times out, until the central communication server connects with a telephone for the vendor retail location, or a time or predetermined number of calls limit has been reached.

When the central communication server connects with the telephone for the vendor retail location, e.g., the telephone is answered, the central communication server may prompt a user of the telephone to handle the inventory inquiry at that time or hand the call off, e.g., to another employee or device or for another time when the user currently does not have time to handle the call. When the user handles the call, the central communication server receives input from the user indicating the available inventory for the requested commerce object, e.g., via voice input or selection of a numeric value on a software or physical keypad.

For instance, the user begins a manual search for the requested commerce object. The user may identify the products being searched for and, optionally, the desired quantity of those products. The user may search for multiple different products, e.g., when a search request includes multiple products or when multiple search requests are for products carried by a single vendor retail location.

In some examples, when a call is handed off to another entity, the central communication server may convert the inventory inquiry to a text message (514), e.g., that includes a phone number and optionally details of the inventory inquire, and provide the text message to another device associated with the vendor retail location. In some examples, the central communication server provides the phone number to the user over the telephone. The central communication server then receives a call at the phone number to initiate a manual search for the product.

In some implementations, the phone number is specific to the product search, the vendor retail location, or both. For instance, the central communication server may use that phone number only for inventory inquiries for a particular vendor retail location. In some examples, the central communication system uses the phone number temporarily, e.g., for a predetermined number of hours, and then the inventory inquiry for which the phone number was activated is terminated, e.g., for that particular vendor retail location.

In some implementations, the process 500 can include additional steps, fewer steps, or some of the steps can be divided into multiple steps. For example, the central communication server may always communicate with a mobile device for a vendor retail location and never initiate a telephone call or always initiate a telephone call for an inventory inquiry.

Figure 6:
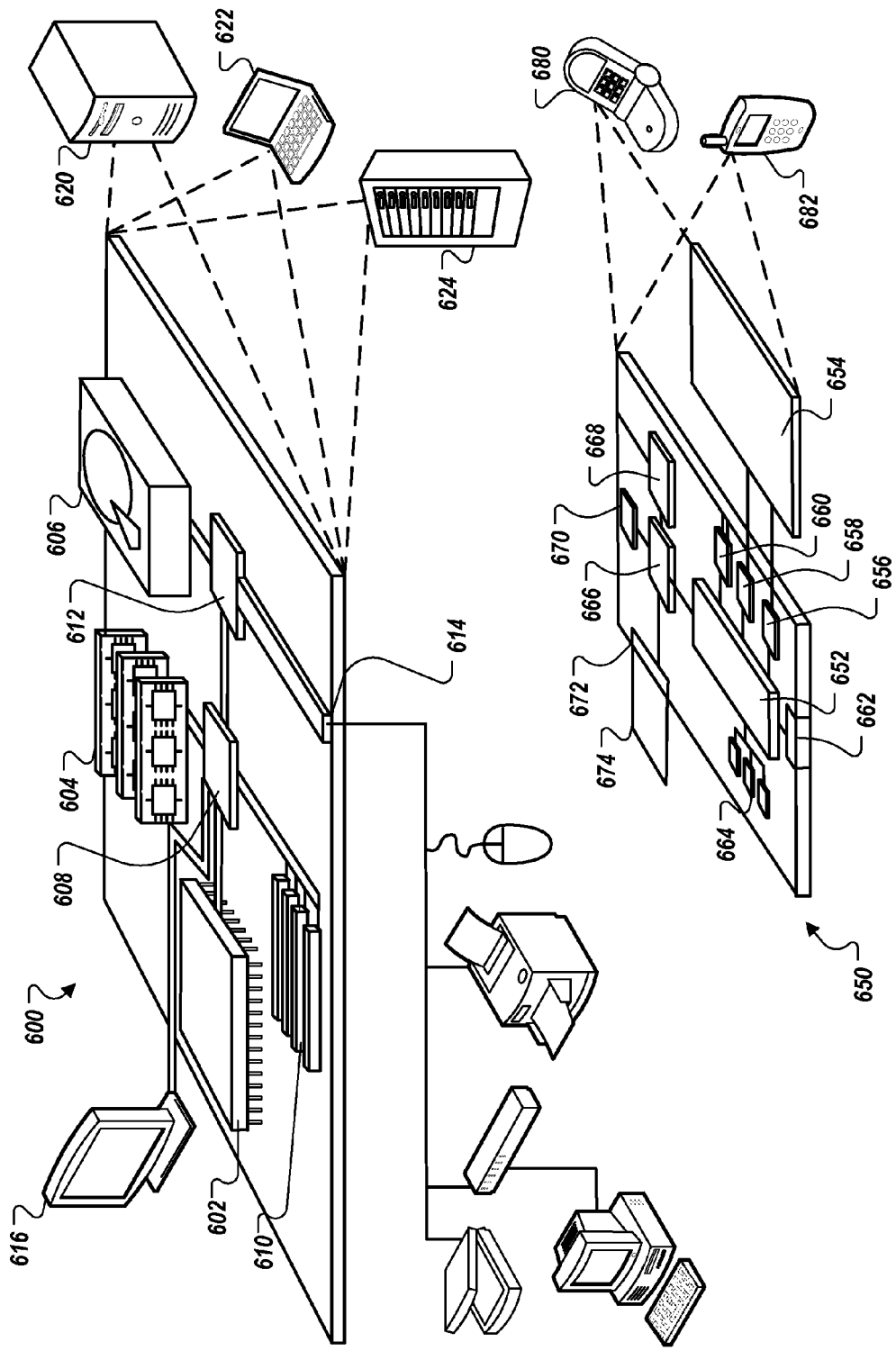
FIG. 6 is a block diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high speed interface 608 connecting to memory 604 and high speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high speed controller 608 is coupled to memory 604, display 616 (e.g., through a graphics processor or accelerator), and to high speed expansion ports 610, which may accept various expansion cards (not shown). In the implementation, low speed controller 612 is coupled to storage device 606 and low speed expansion port 614. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 602 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:

maintaining a central database that includes information about respective inventories of a plurality of different vendors, wherein the central database is kept up-to-date via automated data integration with inventory systems maintained by the plurality of vendors;

receiving, by one or more computer processors coupled to the central database and controlled by a central entity, information from a first user device, the information identifying a requested commerce object for which available inventory is sought and a geographical area;

identifying, by at least one of the one or more computer processors, a plurality of sources of available inventory data for the vendors that are located within a specific distance of the geographical area;

searching, by at least one of the one or more computer processors, the plurality of sources for available inventory of the requested commerce object in response to receiving the information from the first user device identifying the requested commerce object for which available inventory is sought, the searching comprising initiating all three of the following processes in parallel:

performing real-time searching for inventory data of the requested commerce object in the central database by communicating with the central database in response to receiving the information from the first user device identifying the requested commerce object for which available inventory is sought;

searching for inventory data of the requested commerce object in respective databases maintained by individual vendors by communicating over a network with the respective databases in response to receiving the information from the first user device identifying the requested commerce object for which available inventory is sought; and determining, for each of one or more vendor locations that do not maintain inventory databases accessible by any of the one or more computer processors controlled by the central entity, contact information to initiate manual-assisted searching for the requested commerce object by automated communication with one or more entities located at the respective vendor location, the automated communication using the contact information to prompt the one or more entities to respond with information about whether the respective vendor location has available inventory of the requested commerce object in response to receiving the information from the first user device identifying the requested commerce object for which available inventory is sought;

asynchronously receiving and aggregating, by at least one of the one or more computer processors, search results into groups of search results as the search results become available from each source of at least a portion of the plurality of sources;

generating, by at least one of the one or more computer processors, a respective composite user interface corresponding to at least one group of the groups of search results, the respective composite user interface having inventory information from each source of the at least a portion of the plurality of sources corresponding to aggregated search results of the at least one group; and outputting, by at least one of the one or more computer processors for display on a second user device different from the first user device, the respective composite user interface including the aggregated search results of the at least one group.

2. The method of claim 1, wherein:
generating the respective composite user interface comprises generating a respective composite web page; and
outputting for display on the second user device comprises outputting the respective composite web page for display on the second user device.

3. The method of claim 1, further comprising:
maintaining a history of particular types of commerce objects that each of the plurality of different vendors have historically stocked in their respective inventories, wherein identifying the plurality of the sources comprises determining that each of the plurality of different vendors have historically stocked the requested commerce object.

4. The method of claim 1, wherein receiving the information from the first user device comprises receiving identification of the specific distance.

5. The method of claim 1, further comprising receiving identification of the specific distance from the first user device.

6. The method of claim 1, wherein receiving the information from the first user device identifying the geographical area comprises receiving a geolocation.

7. The method of claim 6, wherein receiving the geolocation comprises receiving an internet protocol address.

8. The method of claim 6, wherein receiving the geolocation comprises receiving geographical coordinates.

9. The method of claim 6, wherein receiving the geolocation comprises receiving a zip code.

10. The method of claim 1, wherein serving the instructions for the presentation of the composite user interface to the second user device comprises serving the instructions for the presentation of the composite user interface to a mobile device.

11. The method of claim 10, wherein receiving the information from the first user device comprises receiving the information from a desktop computer or a laptop.

12. The method of claim 1, further comprising terminating the searching and the serving upon detection of a request from the second user device or a determination that a maximum time period has been reached.

13. The method of claim 12, wherein receiving the information from the first user device comprises receiving the maximum time period.

14. An e-commerce inventory searching system comprising:
a central database including information describing the respective inventories of a plurality of different vendors, wherein the central database is kept up-to-date via automated data integration with inventory systems maintained by the plurality of vendors; and
a computer processor coupled to the central database, controlled by a central entity, and in communication with a first user device associated with a user, the computer processor configured to:
receive information from the device identifying a requested commerce object for which available inventory is sought, and a geographical area;
search a plurality of disparate sources of available inventory data for vendors that are located within a specific distance of the geographical area in response to receipt of the information from the first user device identifying the requested commerce object for which available inventory is sought, wherein to search the plurality of disparate sources, the computer processor is configured to:
initiate real-time searching for inventory data of the requested commerce object in the central database by communicating with the central database in response to the receipt of the information from the first user device identifying the requested commerce object for which available inventory is sought,
initiate searching for inventory data of the requested commerce object in respective databases maintained by individual vendors by communicating over a network with the respective databases in response to the receipt of the information from the first user device identifying the requested commerce object for which available inventory is sought, and
determine, for at least one vendor location that does not maintain inventory databases accessible by the computer processor, contact information to initiate manual-assisted searching for the requested commerce object by automated communication with one or more entities located at the at least one vendor location, the automated communication using the contact information to prompt the one or more entities to respond with information about whether the at least one vendor location has available inventory of the requested commerce object in response to the receipt of the information from the first user device identifying the requested commerce object for which available inventory is sought;

asynchronously receive and aggregate search results into groups of search results as the search results become available from each source of at least a portion of the plurality of disparate sources;

generate a respective composite user interface corresponding to at least one group of the groups of search results, the respective composite user interface having inventory information from each source of the at least a portion of the plurality of disparate sources corresponding to aggregated search results of the at least one group; and output for display on a second user device, the respective composite user interface including the aggregated search results of the at least one group.

15. The system of claim 14, wherein to generate the respective composite user interface, the processor is configured to generate a respective composite web page corresponding to the at least one group; and wherein to output the respective composite user interface for display on the second user device, the computer processor is configured to output the respective composite web page for display on the second user device.

16. The system of claim 14, wherein the central database further includes information describing a history of particular types of commerce objects that each of the plurality of vendors have historically stocked in their respective inventories, wherein the computer processor is further configured to identify the plurality of disparate sources of available inventory for each of the plurality of different vendors that have historically stocked the requested commerce object.

17. The system of claim 14, wherein to output the respective composite user interface for display on the second user device, the computer processor is configured to output the respective composite user interface for display on a mobile device.

18. The system of claim 17, wherein to receive the information from the first user device, the computer processor is configured to receive the information from at least one of a desktop computer or a laptop.

19. The system of claim 14, wherein the computer processor is further configured to terminate the search of the plurality of disparate sources of available inventory data based at least in part on at least one of a detection of a request from the second user device or a determination that a maximum time period has been reached.

20. The system of claim 19, wherein the information received from the first user device comprises the maximum time period.

* * * * *